Jan. 4, 1949. T. P. SIMPSON 2,458,109
CONVERSION OF HYDROCARBONS
Filed July 27, 1945
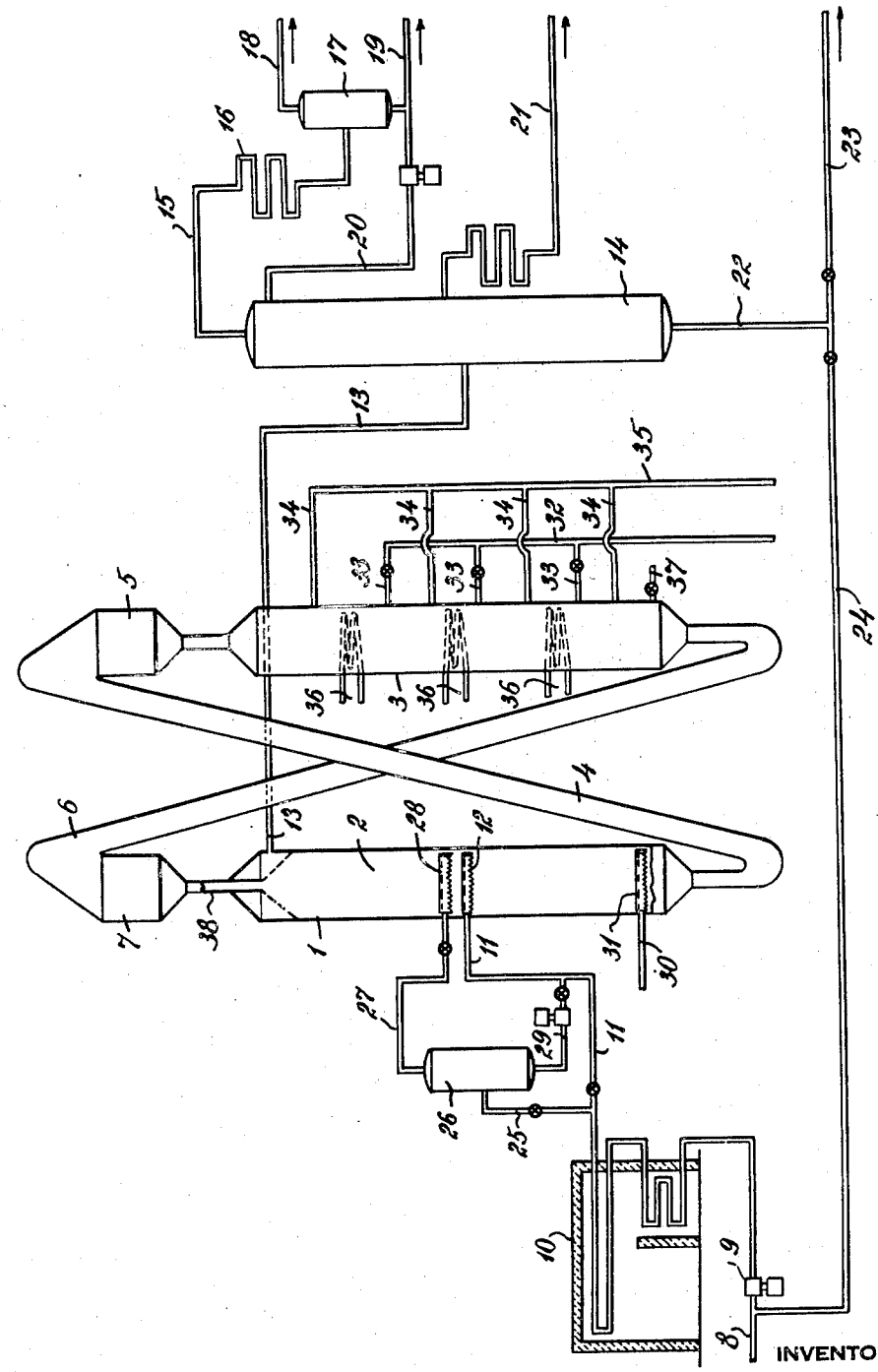
INVENTOR
Thomas P. Simpson
BY
Myron J. Burkhead
ATTORNEY Patented Jan. 4, 1949

2,458,109

UNITED STATES PATENT OFFICE 2,458,109

CONVERSION OF HYDROCARBONS

Thomas P. Simpson, Woodbury, N. J., assignor to Socony-Vacuum Oil Company, Incorporated, a corporation of New York Application July 27, 1945, Serial No. 607,457

4 Claims. (Cl. 196—52)

This invention has to do with the conversion of petroleum hydrocarbons to gasoline of high quality in the presence of a solid contact mass. The commercial development of such process has taken three forms. The older one utilizes the contact mass in the form of a fixed bed through which vapors are passed at reaction temperature, which bed when contaminated is removed from reaction and regenerated in situ. A more recent method utilizes the contact mass in the form of quite small particles capable of being carried by and suspended in the reaction vapors and the reaction is carried out in a vessel wherein such contact material is maintained in a condition of hindered settling. Spent contact material withdrawn from this reactor is regenerated by treating with air for combustion under similar physical conditions and returned to the reactor. The third method utilizes the contact mass in particle form, but in particles of larger size in the form of a moving bed or descending substantially compact column into which the hydrocarbons to be reacted are passed. Spent contact mass material discharged from the bottom of this column is passed through a similar arrangement wherein it is contacted with air for a high temperature regeneration after which it is returned to the reactor. This invention is particularly concerned with operations of this third kind.

In the cracking of heavier high boiling oils, it is often desirable to subject to cracking hydrocarbon materials having a boiling point substantially above the reaction temperature which it is desired to maintain in the reactor. Such heavy hydrocarbons are usually presented to the operation in the form of an oil having a substantial fraction boiling above the desired reaction temperature, and a fraction boiling below the reaction temperature. It has been proposed to achieve the cracking of such products in an operation of this kind by heating the oil charge to a high temperature, but not necessarily to or above the desired reaction temperature and discharging this oil in liquid form into the column of contact mass to be converted therein into products vaporous at the reaction temperature and solid materials deposited upon the contact mass. The products vaporous at the reaction temperature will comprise of course gasoline and lighter materials produced by the conversion reaction and will also include materials of gas oil nature generated by the treatment of the heavy oil in the presence of the contact mass.

In passing it may be noted that the contact masses so utilized partake of the nature of natural or synthetic clays and may comprise natural clays such as fuller's earth, activated clays, and synthetic compositions of alumina and/or silica with or without related materials, produced by any of numerous known means, and may take the form of granules, formed pellets, beads and the like. Such materials may themselves be catalytic to the desired reaction or may be impregnated with or act as carriers or supports for other materials such as certain metallic oxides and the like, which are catalytic or whose presence is desired for the purpose of the reaction.

Within the broad limits of the above reaction method, I have found that with some stocks, particularly those stocks of long boiling range, comprising both materials vaporous below the desired reaction temperature and a substantial fraction of materials boiling above the desired reaction temperature, it frequently become desirable to subject the lower boiling portions of the charge to somewhat different conditions of time and temperature than appear to be best for the heavier portions of the charge.

Accordingly, it is an object of this invention to provide a method of treating materials of long boiling range having substantial fractions boiling above the desired reaction temperature in a manner such as to produce optimum conversion conditions for the several portions of the charge in a manner hereinafter explained.

The method of operation with which this invention is concerned may be understood most readily by reference to the drawing attached hereto, the single figure of which sets forth a diagrammatic representation of my operation. In this drawing, 1 is a reactor containing a continuous substantially compact column of particle form solid contact mass material 2, and 3 is a regenerator of generally similar nature. Spent contact mass material is moved by elevator 4 to storage hopper 5 above regenerator 3 and regenerated contact mass material is conveyed by elevator 6 to storage hopper 7 above reactor 1. The above described process of operation is set forth particularly in patents of Thomas P. Simpson and associates, such as Simpson, Payne, Crowley, Patent No. 2,320,318. Charge oil, comprising a long boiling range material containing materials boiling both above and below the desired reaction temperature, is brought to the system through pipe 8 and is forced by pump 9 through the coils in furnace 10 wherein it is heated to a temperature near the desired reaction temperature and sufficient to secure separation of the charge into a vapor portion and a liquid portion. After being heated, it may be discharged through pipe 11 into a distributor 12 placed within contact mass column 2 and located at a point intermediate the ends of that column. Separation of vapor from liquid takes place and the vaporous portion of the charge oil passes upwardly through that portion of contact mass column 2 lying above distributor 12 and is therein converted. The liquid portion of the charge, becoming admixed with the down moving contact mass in column 2, is deposited thereon and proceeds downwardly through that portion of column 2 below distributor 12, therein to be converted partially into a solid deposit upon the contact mass material, partially into gasoline or lighter products, and partially into materials of gas oil nature boiling below the temperature obtained within the lower portion of contact mass column 2. The vapors so generated in the bottom portion of the contact mass column 2 pass upwardly through said column, past distributor 12, and through the upper portion of said column. Vaporous products of reaction are removed from the column by pipe 13 and pass through that pipe into fractionator 14, there to be separated into an overhead cut of gasoline and lighter materials passing through pipe 15, condenser 16 and gas separator 17, with non-condensed light material being withdrawn through pipe 18 to gas recovery or further processing, with gasoline being withdrawn through pipe 19 and a portion returned through pipe 20 for fractionator control. A side stream of material boiling above gasoline may be taken at 21, if desired, and product of the nature of a recycle stock comprising either all material heavier than gasoline, if the side stream is not taken at 21, or the material boiling above the side stream, if such side stream is taken, is withdrawn at pipe 22 to be removed from the system by pipe 23 or returned to cracking by pipe 24.

Returning for a moment to the charge oil after heating and before its entry to the contact mass column, the process in many cases may be operated more conveniently, particularly when a larger portion of the charge is desired to be vaporized by operating in the following manner:

Instead of passing directly to the column in the reactor through pipe 11, the heated oil is diverted through pipe 25 into vapor separator 26. Vapors therefrom are introduced through pipe 27 and distributor 28 to a point in the column adjacent distributor 12 and liquid material from 26 is passed through pipe 29 into pipe 11 and distributor 12.

Turning to the bottom of the contact mass column 2, a purging medium such as steam or other inert gas is introduced into the bottom of the reactor through pipe 30 and distributor 31 for the purpose of insuring that hydrocarbon material other than "coke" shall not escape with the spent contact mass being removed from the reactor. Spent contact mass passing through elevator 4 in hopper 5 into regenerator 3 is contacted in regenerator 3 with air for the purpose of burning off the combustible contaminant material deposited upon it. This regeneration air or other suitable oxidizing medium is introduced through the agency of manifold 32 and pipes 33, regeneration fumes being removed through pipes 34 and manifold 35. Temperature control of the regenerator may be had in known manner by fluid heat transfer medium introduced into the regenerator in appropriate cooling coils for indirect heat transfer as shown at 36. A purge gas, if desired, may be introduced near the exit end of the regenerator, as by pipe 37. The hot regenerated contact mass material withdrawn from the regenerator in heated condition is delivered through elevator 6, hopper 7 and feed pipe 38 into the top of the reaction column. The temperature of this material and its quantity together with the temperature of the incoming charge stock are balanced so as to provide a desired amount of heat from both sources to maintain the desired reaction temperature levels within reaction column 2.

This process provides a method whereby stocks having a substantial portion, or even all, boiling above the temperature of reaction, which as is customary in the art, may range between about 800° F. and about 1000° F. can be handled in the presence of a solid compact column of a particle form solid contact mass catalytic to the desired reaction. Not only is it applicable to crude residues, but also to distillate stocks of long boiling range having a large portion boiling above 840–850° F., such as vacuum gas oil from Mid Continent or Coastal Crudes, or the like.

As is customary in the art, the reaction temperature will be of the same nature as those usually applied, ranging from about 800° F. and 850° F. upwards to temperatures of the order of 950° F. to 1000° F.

In connection with the temperature of materials leaving the furnace 10, particularly when the vapor separator 26 is used it should be pointed out that it is a well known fact that vapor lines handling heavy hydrocarbons at temperatures above about 840–850° F. tend to coke rapidly, therefore this temperature becomes a practical operating limit particularly when vapor separation is made outside of the contact mass column.

This method is particularly applicable to residual stocks from crude distillation, to vacuum gas oils, and to gas oils having a long heavy end. While such oils are usually analytically distilled under vacuum, it is usual to correct the vapor temperature vs. percent received in such analyses to atmospheric basis. Such corrected analytical data are used herein. When an oil is referred to as "having 25% boiling below 950° F.," that means that when 25% of the charge has been received in an analytical distillation, the vapor temperature, reduced to atmospheric pressure, is 950° F., and similarly.

This process is useful with such charge stocks as vacuum gas oils, having 60% or so boiling above 800° F. With such oils, heating to 800° F. or 850° F. in a pipe still under the usual small back pressure does not permit of substantial vaporization, and when such oils are discharged into a reactor operating at 850° F. to 900° F. and usual reactor pressures, a substantial portion of the oil is deposited upon the catalyst as liquid.

The process is most useful for handling residual stocks from distillation of crudes for gas oils, lubricating stocks, and the like. Such oils usually do not have over 25% or so boiling below 900° F., and, obviously, even if heated to a high reaction temperature of the order of 975° F. would still remain largely unvaporized, while heating to such a temperature would produce some undesirable thermally cracked gasoline.

This method of operating has several substantial advantages when applied to a stock appropriate for its use. The vapors formed by the original heating of the charge stock are subjected to a controlled relatively short time high temperature reaction. The liquid from the original charge oil heating is separately subjected to a relatively longer treatment at lower temperature and, due to the fact that it is treated apart from the lighter boiling materials of the original charge stock, I am capable of achieving a considerably greater catalyst to oil ratio for this material than if I had charged all of the original charge oil in such manner that all of it had to pass through the same amount of contact mass material. Due to this feature, I am capable of arriving at a well balanced treatment of both of the fractions of the original charging stock.

I claim:

1. The method of converting a heavy, high boiling hydrocarbon oil into high quality gasoline by catalytic cracking in the presence of a particle-form solid catalytic contact mass which comprises circulating said contact mass in a closed cyclic path through an enclosed conversion zone and an enclosed regenerating zone, moving said contact mass through said conversion zone in the form of a substantially compact column, heating a charge oil containing a substantial fraction boiling above the desired reaction temperature to a temperature not higher than said reaction temperature, discharging said oil in said heated condition into said column at a point intermediate the ends thereof to be converted therein, removing vaporous products of conversion from the upper end of said column, passing hydrocarbon vapors liberated at and below the oil feed point upwardly through that portion of the column above said feed point, removing contaminated contact mass from the bottom of said conversion zone while substantially preventing escape of vaporous hydrocarbon material therewith, subjecting the contaminated contact mass to a combustion regeneration at high temperature, removing the contact mass from regeneration and introducing it in heated condition into said conversion zone while substantially preventing the escape of combustion gases into said conversion zone, the heat in the said contact mass and the temperature of the charge oil being proportioned to maintain the conversion zone at a desired reaction temperature between about 800° F. and about 1000° F. and not above the boiling point of said substantial fraction of the charge oil.

2. The method of claim 1 in which the charge oil is one having not over about 40% boiling below 800° F.

3. The method of claim 1 in which the charge oil is one having not over about 25% boiling below 900° F.

4. The method of converting a heavy, high boiling hydrocarbon oil into high quality gasoline by catalytic cracking in the presence of a particle form solid catalytic contact mass which comprises circulating said contact mass in a closed cyclic path through an enclosed conversion zone and an enclosed regenerating zone, moving said contact mass through said conversion zone in the form of a substantially compact column, heating a charge oil containing a substantial fraction boiling above the desired reaction temperature to a temperature not above about 840° F., separating said charge oil into a vapor portion and a liquid portion, contacting the vapors so separated with the contact mass in the upper portion of said column in the absence of unvaporized portions of the charge oil, introducing liquid so separated into said column at a point intermediate the ends of the column and below said upper portion of the column wherein vapors are treated, removing vaporous products of hydrocarbon conversion from the upper end of said column, passing hydrocarbon vapors liberated below the liquid oil feed point upwardly through the upper portion of said column together with the oil vapors initially introduced thereinto, removing contaminated contact mass from the bottom of said conversion zone while substantially preventing the escape of vaporous hydrocarbon material therewith, subjecting the contaminated contact mass to a combustion regeneration at high temperature, removing the contact mass from regeneration and introducing it in heated condition into said conversion zone while substantially preventing the escape of combustion gases into said conversion zone, the heat in the said contact mass and the temperature of the charge vapors and charge liquid being proportioned to maintain the conversion zone at a desired reaction temperature between about 800° F. and about 1000° F. and not above the boiling point of said substantial fraction of the charge oil.

THOMAS P. SIMPSON.

REFERENCES CITED

The following references are of record in the file of this patent:

UNITED STATES PATENTS

| Number | Name | Date |
| --- | --- | --- |
| 2,348,699 | Tuttle | May 9, 1944 |
| 2,356,611 | Peters | Aug. 22, 1944 |
| 2,357,136 | Rubin | Aug. 29, 1944 |
| 2,372,018 | Ruthruff | Mar. 20, 1945 |
| 2,385,189 | Bowles | Sept. 18, 1945 |
| 2,387,378 | Wolk | Oct. 23, 1945 |